UNITED STATES PATENT OFFICE.

RICHARD WASHBURN, OF MONSEY, NEW YORK.

IMPROVEMENT IN THE MANUFACTURE OF GLASS.

Specification forming part of Letters Patent No. 52,917, dated February 27, 1866.

*To all whom it may concern:*

Be it known that I, RICHARD WASHBURN, of Monsey, in the county of Rockland and State of New York, have invented a new and useful Improvement in the Manufacture of Glass; and I do hereby declare that the following is a full, clear, and exact description thereof, which will enable those skilled in the art to make and use the same.

This invention consists in the use of what is known by the term of "glass ore," for the purpose of manufacturing glass, either alone or mixed with some other flux, such as soda-ash.

The rock or ore which I use, and which I have termed "glass ore," is found in the neighborhood of Monsey, in the county of Rockland and State of New York. It is dark gray, and when broken its faces are brownish black. It contains undoubtedly some iron, and also a large quantity of silicates, though I have never analyzed the same.

When placed in a pot and exposed to a strong fire it melts like glass, and a black mass is obtained similar in every respect to glass, and suitable for a great many purposes where dark-colored glass can be used.

The operation of melting my glass ore can be facilitated by adding a small quantity of some suitable flux—for instance, from four to ten per cent. of soda-ash. And by subjecting the ore to a suitable purifying process, whereby the iron and other impurities are removed, it can be prepared so that it produces a white or nearly white glass.

What I claim as new, and desire to secure by Letters Patent, is—

1. The use of what I term "glass ore" in the manufacture of glass.

2. The use of glass ore mixed with soda-ash or other suitable flux in the manufacture of glass.

3. Glass produced from what I term "glass ore," as a new article of manufacture.

RICHARD WASHBURN.

Witnesses:
WM. F. MCNAMARA,
M. M. LIVINGSTON.